US011890240B2

(12) United States Patent
Ponsi et al.

(10) Patent No.: US 11,890,240 B2
(45) Date of Patent: Feb. 6, 2024

(54) METHOD AND DEVICE FOR TURNING AND POSITIONING A PATIENT USING FILLABLE CHAMBERS

(71) Applicant: Sage Products, LLC, Cary, IL (US)

(72) Inventors: Lawrence G. Ponsi, Wheeling, IL (US); Abhishek R. Patel, North Barrington, IL (US); Brett C. Blabas, Naperville, IL (US); Jay R. Roberts, Cary, IL (US)

(73) Assignee: Sage Products, LLC, Cary, IL (US)

( * ) Notice: Subject to any disclaimer, the term of this patent is extended or adjusted under 35 U.S.C. 154(b) by 0 days.

(21) Appl. No.: 17/733,422

(22) Filed: Apr. 29, 2022

(65) Prior Publication Data

US 2022/0347026 A1 Nov. 3, 2022

Related U.S. Application Data

(60) Provisional application No. 63/217,631, filed on Jul. 1, 2021, provisional application No. 63/182,504, filed on Apr. 30, 2021.

(51) Int. Cl.
*A61G 7/00* (2006.01)

(52) U.S. Cl.
CPC .................................... *A61G 7/001* (2013.01)

(58) Field of Classification Search
CPC . A61G 7/05769; A61G 7/05776; A61G 7/001
USPC ........................................................ 5/81.1 T
See application file for complete search history.

(56) References Cited

U.S. PATENT DOCUMENTS

2007/0006388 A1* 1/2007 Townsend .............. A61G 7/001 5/715

* cited by examiner

*Primary Examiner* — Justin C Mikowski
*Assistant Examiner* — Adam C Ortiz
(74) *Attorney, Agent, or Firm* — FOLEY & LARDNER LLP

(57) ABSTRACT

A system for repositioning or supporting a patient includes a first sheet, the first sheet configured to receive a patient on a top side, and a second sheet coupled to the first sheet, wherein the second sheet comprises at least one tubular pocket therein, and wherein the second sheet is configured to contact a support surface. The system further includes at least one support device configured to be inserted within the at least one tubular pocket, such that when the at least one support device is inserted within the at least one tubular pocket, at least a portion of the patient is elevated relative to the support surface.

14 Claims, 13 Drawing Sheets

METHOD AND DEVICE FOR TURNING AND POSITIONING A PATIENT USING FILLABLE CHAMBERS

CROSS-REFERENCE TO RELATED APPLICATIONS

This application claims the benefit of and priority to U.S. Provisional Patent Application No. 63/182,504, filed Apr. 30, 2021, and U.S. Provisional Patent Application No. 63/217,631, filed Jul. 1, 2021, the entire disclosures of which are hereby incorporated by reference herein.

BACKGROUND

The present disclosure relates generally to an apparatus, system, and method for positioning a patient, and in particular for turning and supporting a patient.

When a patient is unconscious, disabled, or otherwise unable to move under their own power, caregivers often "turn" patients in order to avoid pressure ulcers from forming on the patient's torso. Turning a patient often involves repositioning the patient from side-to-side, every two hours, in order to reduce the risk of injury from localized pressure. However, a patient can slide out of position, thus increasing the patient's risk of developing a pressure ulcer. Furthermore, turning and supporting the patient is labor intensive and can place the caregivers at risk of injury.

The present disclosure seeks to overcome certain of these limitations and other drawbacks of existing devices, systems, and methods, and to provide new features not heretofore available.

SUMMARY

One aspect of the present disclosure relates to an inflatable device. The inflatable device includes a first layer of material and a second layer of material coupled together around at least a peripheral edge, where at least one cavity is formed between the first layer and the second layer. The inflatable device further includes at least one input port for receiving air to inflate the at least one cavity, where the inflatable device is configured such that when the at least one cavity is inflated, a turning wedge and a support bolster are formed.

In various embodiments, the first layer is further attached to the second layer along a first longitudinal attachment line and along a second longitudinal attachment line, spaced apart from the first longitudinal attachment line such that the turning wedge is formed between a first peripheral side edge and the first longitudinal attachment line and the support bolster is formed between a second peripheral side edge and the second longitudinal attachment line. In some embodiments, a distance between the first peripheral side edge and the first longitudinal attachment line is greater than a distance between the second peripheral side edge and the second longitudinal attachment line such that the turning wedge inflates to a greater height than the support bolster. In other embodiments, the distance between the first peripheral side edge and the first longitudinal attachment line is 16 inches and the distance between the second peripheral side edge and the second longitudinal attachment line is 11 inches. In yet other embodiments, a distance between the first longitudinal attachment line and the second longitudinal attachment line forms a valley between the turning wedge and the support bolster. In various embodiments, the at least one cavity includes a first cavity forming the turning wedge and a second cavity forming the support bolster. In some embodiments, the inflatable device also includes a third layer of material coupled to the first layer of material and the second layer of material around at least the peripheral edge, where at least one lower cavity is formed between the second layer and the third layer, and where the inflatable device is further configured such that when the at least one lower cavity is inflated, a second turning wedge and a second support bolster are formed. In other embodiments, the inflatable device is configured such that when the at least one cavity is inflated, a patient laying on the inflatable device is turned towards a first lateral side and when the at least one lower cavity is inflated, the patient is turned towards a second lateral side without adding or removing any structures under the patient. In yet other embodiments, the inflatable device further includes a first input port for inflating the at least one cavity and a second input port for inflating the at least one lower cavity.

In various embodiments, the third layer is further attached to the second layer along a third longitudinal attachment line and along a fourth longitudinal attachment line, spaced apart from the third longitudinal attachment line such that the second turning wedge is formed between a first peripheral side edge and the third longitudinal attachment line and the second support bolster is formed between a second peripheral side edge and the fourth longitudinal attachment line. In some embodiments, a distance between the first peripheral side edge and the third longitudinal attachment line is greater than a distance between the second peripheral side edge and the fourth longitudinal attachment line such that the second turning wedge inflates to a greater height than the second support bolster. In other embodiments, a distance between the first peripheral side edge and the third longitudinal attachment line is 16 inches and a distance between the second peripheral side edge and the fourth longitudinal attachment line is 11 inches. In yet other embodiments, a distance between the third longitudinal attachment line and the fourth longitudinal attachment line forms a valley between the second turning wedge and the second support bolster. In various embodiments, the at least one lower cavity includes a first lower cavity forming the second turning wedge and a second lower cavity forming the second support bolster. In some embodiments, the first turning wedge is on a first side of the inflatable body, the first support bolster is on a second side of the inflatable device, the second support bolster is on the first side of the inflatable body, and the second turning wedge is on the second side of the inflatable body, such that the first and second turning wedges are offset and the first and second support bolsters are offset.

Another aspect of the present disclosure relates to a system for repositioning or supporting a patient. The system includes a first sheet, the first sheet configured to receive a patient on a top side. The system further includes a second sheet coupled to the first sheet, where the second sheet includes at least one tubular pocket therein, and wherein the second sheet is configured to contact a support surface The system also includes at least one support device configured to be inserted within the at least one tubular pocket, such that when the at least one support device is inserted within the at least one tubular pocket, at least a portion of the patient is elevated relative to the support surface.

In various embodiments, the second sheet includes at least three pockets. In some embodiments, a first pocket of the at least one tubular pocket is disposed near a top end of the first sheet, the first pocket being configured to form a cushion for a head of the patient. In other embodiments, the at least one support device is at least one pillow, where the at least one pillow includes a pillow case having at least one engagement region, and where the at least one engagement region is configured to engage with the at least one tubular pocket to secure the at least one pillow within the at least one tubular pocket. In yet other embodiments, the top sheet includes one or more retention regions configured to prevent sliding of the patient relative to the top sheet.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
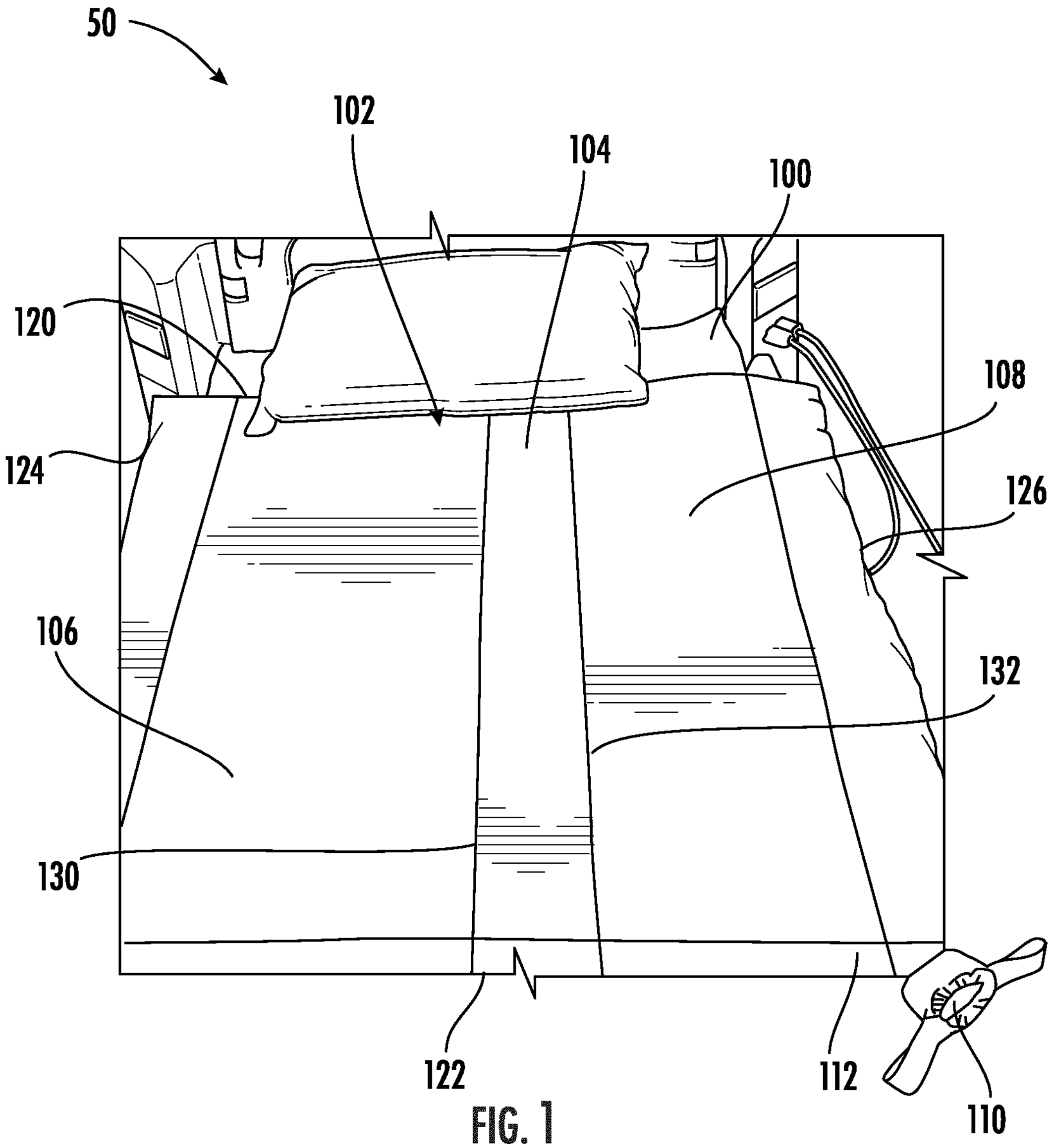
FIG. 1 is a top view of a patient positioning and support system, according to an exemplary embodiment.

Referring to FIG. 1, a patient positioning and support system 50 is shown, according to an exemplary embodiment. As shown in FIG. 1, the patient positioning and support system 50 includes an inflatable patient support device 102 (hereinafter, "inflatable device" 102) lying on a support structure 100. The support structure 100 may be a bed, gurney, stretcher, cot, operating table, or any other support structure for medical and/or patient care use (e.g., for supporting a person in a supine or other position). The support structure 100 is not shown in detail, but may generally include known features of support structures for medical and/or other patient care use (e.g., a frame, the support structure 100 supported by the frame, the support structure 100 including a head, a foot, opposed sides or edges, etc.). Similarly, the support structure 100 may also include other medical components known in the art (e.g., bed sheets, pillows, blankets, additional sheets, etc.). In some embodiments, the support structure 100 is adjustable, such that the support structure 100, or portions thereof, may be raised, lowered, positioned in an incline, positioned in a decline, etc. It should be understood that the patient positioning and support system 50, and the components thereof, may be used with different support structures 100 for use to position and support a patient.

As shown in FIG. 1, the inflatable device 102 may include a first or top inflatable portion 104, having a turning wedge 106 and a support bolster 108, and an inflation port 110. The inflatable device 102 may be flexible and foldable when in the non-inflated state, and may be configured to be positioned on the support structure 100. As discussed in greater detail below, the top inflatable portion 104 may define an internal cavity configured to be inflated with air or another fluidic substance. The top inflatable portion 104 may be defined by at least a first layer 112 forming a top wall of the internal cavity and a second layer 114 (not shown) forming a bottom wall of the internal cavity, with the first layer 112 and the second layer 114 connected to define the cavity. In an exemplary embodiment, the first layer 112 and the second layer 114 are two separate pieces of sheet material that are connected together around their peripheries (e.g., at edges 120-126), such as by stitching, adhesives, or one or more other suitable connection techniques. In some embodiments, the first layer 112 and the second layer 114 may be connected by a side wall, or a plurality of side walls, made from a flexible or ridged material attached to each sheet at their peripheries. In other embodiments, the first layer 112 and the second layer 114 may be made from a single piece of material that is folded over and connected by stitching along the free ends. The first layer 112 and the second layer 114 may have a single layer or multiple layers, and may be formed of the same or different materials (e.g., high-friction materials, low-friction materials, etc.).

As shown in FIG. 1, the inflatable device 102 (i.e., top inflatable portion 104) further includes at least one cavity forming the turning wedge 106 and the support bolster 108. In an exemplary embodiment, the turning wedge 106 and the support bolster 108 are defined by the first layer 112 and the second layer 114 and peripheral edges (e.g., edges 120-126). The turning wedge 106 and the support bolster 108 are further defined by longitudinal attachment lines (e.g., lines 130-132) of the inflatable device 102, as described below. For example, the inflatable device 102 may include peripheral edges, including a head edge 120, a foot edge 122, a first peripheral side edge 124, and a second peripheral side edge 126. Further, the inflatable device 102 may also include longitudinal attachment lines, including a first longitudinal attachment line 130 and a second longitudinal attachment line 132. As shown in FIG. 1, the first layer 112 may be attached to the second layer 114 around the peripheral edges (e.g., edges 120-126), as well as, along the first longitudinal attachment line 130 and the second longitudinal attachment line 132. In this regard, the turning wedge 106 may be defined by the first layer 112 and the second layer 114, between the first peripheral side edge 124 and the first longitudinal attachment line 130 (and the head edge 120 and the foot edge 122). Similarly, the support bolster 108 may be defined by the first layer 112 and the second layer 114, between the second peripheral side edge 126 and the second longitudinal attachment line 132 (and the head edge 120 and the foot edge 122). The top inflatable portion 104 (i.e., the turning wedge 106 and the support bolster 108) is described in greater detail below.

In an exemplary embodiment, the inflatable device 102 may be made of materials that have properties that are desirable for a particular application. For example, the materials may have properties that include favorable breathability, durability, imagining compatibility, flammability, biocompatibility, pressure distribution profile, heat transmission, electrical conductivity, and cleaning properties. In an exemplary embodiment, the inflatable device 102 may be intended to be left beneath the patient for an extended period of time. As such, the first layer 112 and the second layer 114 may be made of breathable fabrics or other materials that have sufficient breathability to allow passage of heat and moisture vapor away from the patient, while also having sufficient resistance to air passage to retain inflation. In other embodiments, a portion of the first layer 112 and/or the second layer 114 may be made of a high-friction material (e.g., non-contact areas) and/or a low-friction material.

Still referring to FIG. 1, the inflatable device 102 may also include an inflation port 110. As shown in FIG. 1, the inflation port 110 may be positioned near a corner of the inflatable device 102 (e.g., at one of the edges 120-126), and may be configured to permit inflation of the inflatable device 102, or more particularly, to inflate the top inflatable portion 104 (e.g., the turning wedge 106 and/or the support bolster 108). In some embodiments, the inflatable device 102 may include a plurality of inflation ports 110, which may be used to separately inflate and/or deflate portions of the inflatable device 102.

Figure 2:
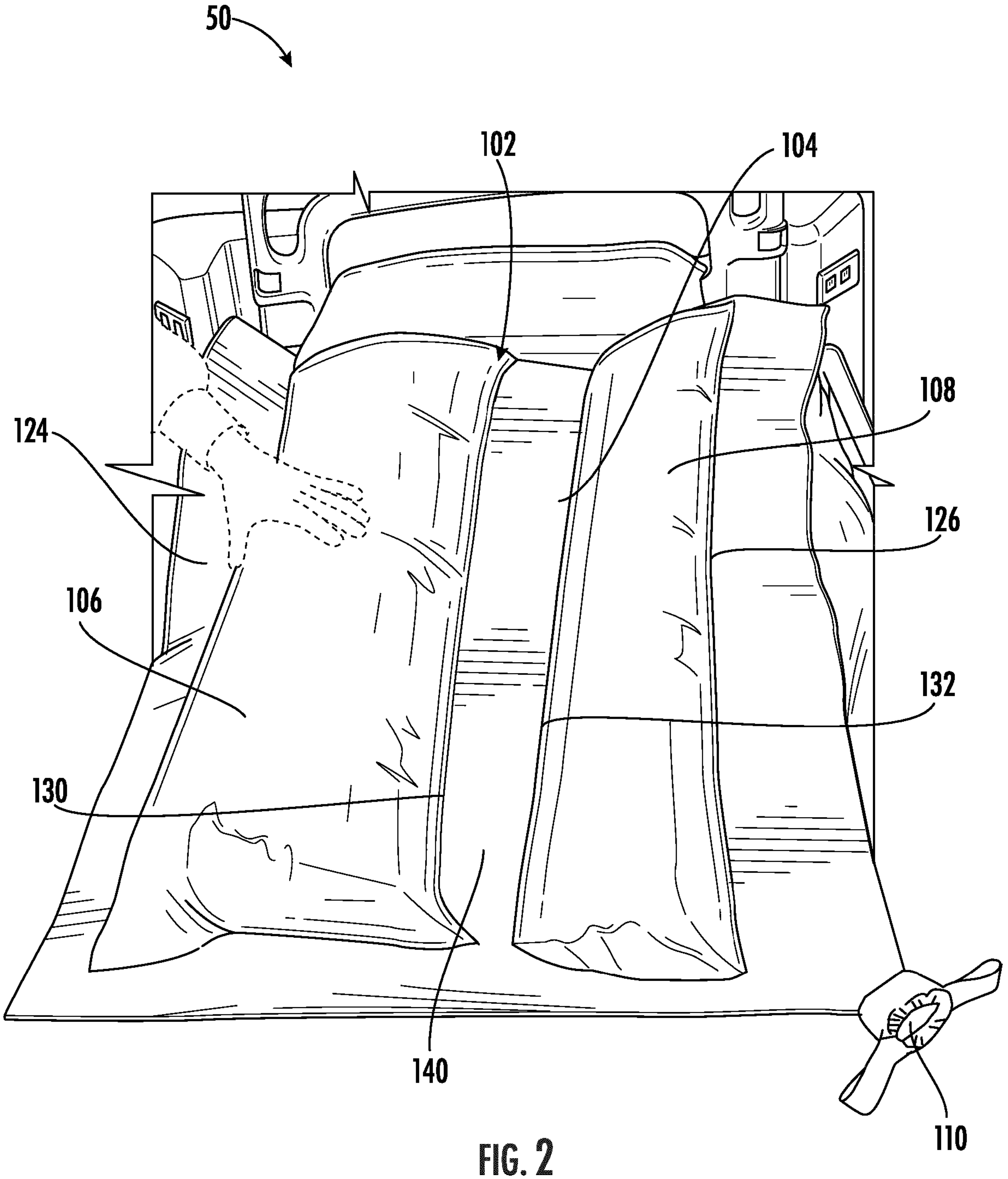
FIG. 2 is another top view of the patient positioning and support system of FIG. 1, according to an exemplary embodiment.

Referring now to FIG. 2, an inflatable device 102 of the patient positioning and support system 50 is shown in an inflated state, according to an exemplary embodiment. When the inflatable device 102 is inflated (e.g., via the inflation port 110), the turning wedge 106 and the support bolster 108 are formed. In one embodiment, one of the turning wedge 106 or the support bolster 108 is inflated first (e.g., via the inflation port 110), then the other of the turning wedge 106 or the support bolster 108 is inflated (e.g., via a port, gap, seal, etc.). In another embodiment, both the turning wedge 106 and the support bolster 108 are inflated at the same time. In yet other embodiments, a first inflation port 110 may be used to inflate/deflate the turning wedge 106, and a second inflation port 110 may be used to inflate/deflate the support bolster 108. It should be understood that any combination of inflation ports 110, and/or processes of inflating and/or deflating the top inflatable portion 104, is contemplated herein.

As shown in FIG. 2, when the top inflatable portion 104 is inflated, the turning wedge 106 may inflate to a greater height (e.g., more volume) than the support bolster 108. In this regard, the distance between the first peripheral side edge 124 and the first longitudinal attachment line 130 is greater than the distance between the second peripheral side edge 126 and the second longitudinal attachment line 132. In an exemplary embodiment, the distance between the first peripheral side edge 124 and the first longitudinal attachment line 130 is 16 inches, and the distance between the second peripheral side edge 126 and the second longitudinal attachment line 132 is 11 inches. In an exemplary embodiment, the first longitudinal attachment line 130 and the second longitudinal attachment line 132 are separated by a distance (e.g., 5 inches), such that when the inflatable device 102 is inflated there is a valley 140 between the turning wedge 106 and the support bolster 108.

Figure 3:
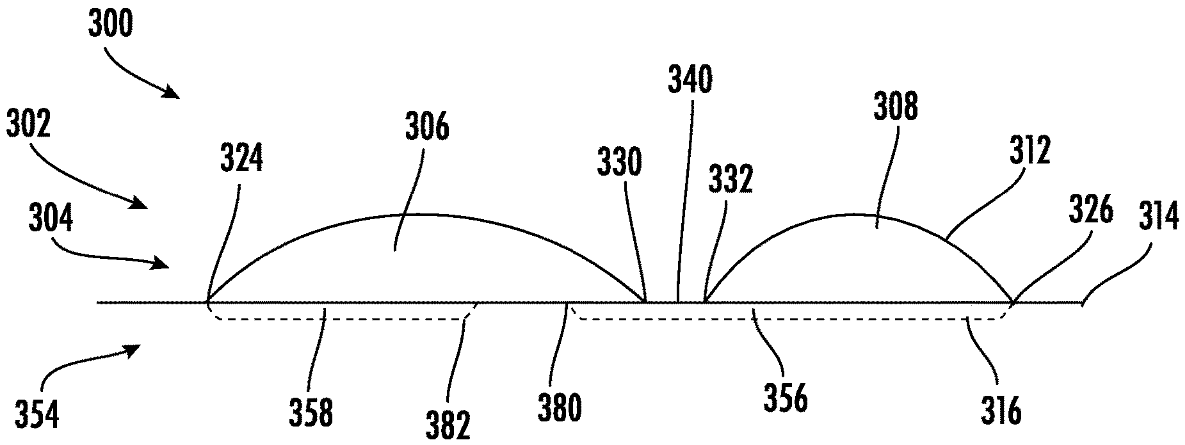
FIG. 3 is an end elevation view of a patient positioning and support system of FIG. 2, according to an exemplary embodiment.

Referring now to FIG. 3, a patient positioning and support system 300 is shown, according to another exemplary embodiment. The patient positioning and support system 300 may be an exemplary embodiment of the patient positioning and support system 50 of FIG. 1. As shown in FIG. 3, the patient positioning and support system 300 includes an inflatable patient support device 302 (hereinafter, "inflatable device" 302).

As shown in FIG. 3, the inflatable device 302 includes a top inflatable portion 304, having a top turning wedge 306 and a top support bolster 308, and a bottom inflatable portion 354, having a bottom turning wedge 356 and a bottom support bolster 358. As discussed above with regard to FIG. 1, the top inflatable portion 304 may define a top internal cavity configured to be inflated with air. Further, the top inflatable portion 304 is defined by at least a first layer 312 forming a top wall of the top internal cavity and a second layer 314 forming a bottom wall of the top internal cavity, with the first layer 312 and the second layer 314 connected to define the top cavity (as discussed above). The inflatable device 302 also includes a first peripheral side edge 324 and a second peripheral side edge 326, as well as, a first longitudinal attachment line 330 and a second longitudinal attachment line 332. As shown in FIG. 3, the first layer 312 may be attached to the second layer 314 (and/or a third layer 316) around the peripheral edges (e.g., edges 324-326), as well as, along the first longitudinal attachment line 330 and the second longitudinal attachment line 332. In this regard, the top turning wedge 306 may be defined by the first layer 312 and the second layer 314, between the first peripheral side edge 324 and the first longitudinal attachment line 330. Similarly, the top support bolster 308 may be defined by the first layer 312 and the second layer 314, between the second peripheral side edge 326 and the second longitudinal attachment line 332. Further, as shown in FIG. 3, when the inflatable device 302 is inflated, the top turning wedge 306 and the top support bolster 308 may be inflated, creating a top valley 340.

As shown in FIG. 3, the inflatable device 302 also includes the second or bottom inflatable portion 354, having the bottom turning wedge 356 and the bottom support bolster 358. Similar to the top inflatable portion 304, the bottom inflatable portion 354 may define a bottom cavity ("lower cavity") configured to be inflated with air. The bottom inflatable portion 354 may be defined by at least the second layer 314 forming a top wall of the bottom internal cavity and a third layer 316 forming a bottom wall of the bottom internal cavity, with the second layer 314 and the third layer 316 connected to define the bottom cavity (as discussed above). The inflatable device 302 may also include a third longitudinal attachment line 380 and a fourth longitudinal attachment line 382. As shown in FIG. 3, the third layer 316 may be attached to the second layer 314 (and/or the first layer 312) around the peripheral edges (e.g., edges 324-326), as well as, along the third longitudinal attachment line 380 and the fourth longitudinal attachment line 382. In this regard, the bottom turning wedge 356 may be defined by the third layer 316 and the second layer 314, between the second peripheral side edge 326 and the third longitudinal attachment line 380. Similarly, the bottom support bolster 358 may be defined by the third layer 316 and the second layer 314, between the first peripheral side edge 324 and the fourth longitudinal attachment line 382. As shown in FIG. 3, in some embodiments when the top inflatable portion 304 is inflated (e.g., top turning wedge 306 and top support bolster 308), the bottom inflatable portion 354 can be deflated.

Still referring to the embodiment of FIG. 3, when the top inflatable portion 304 is inflated, the top turning wedge 306 inflates to a greater height (e.g., more volume) than the top support bolster 308. As discussed with regard to FIG. 1, the distance between the first peripheral side edge 324 and the first longitudinal attachment line 330 is greater than the distance between the second peripheral side edge 326 and the second longitudinal attachment line 332. In an exemplary embodiment, the distance between the first peripheral side edge 324 and the first longitudinal attachment line 330 is 16 inches, and the distance between the second peripheral side edge 326 and the second longitudinal attachment line 332 is 11 inches. Also in a preferred embodiment, the first longitudinal attachment line 330 and the second longitudinal attachment line 332 may be separated by a distance (e.g., 5 inches), such that when the inflatable device 302 is inflated there is a top valley 340 between the top turning wedge 306 and the top support bolster 308.

Figure 4:
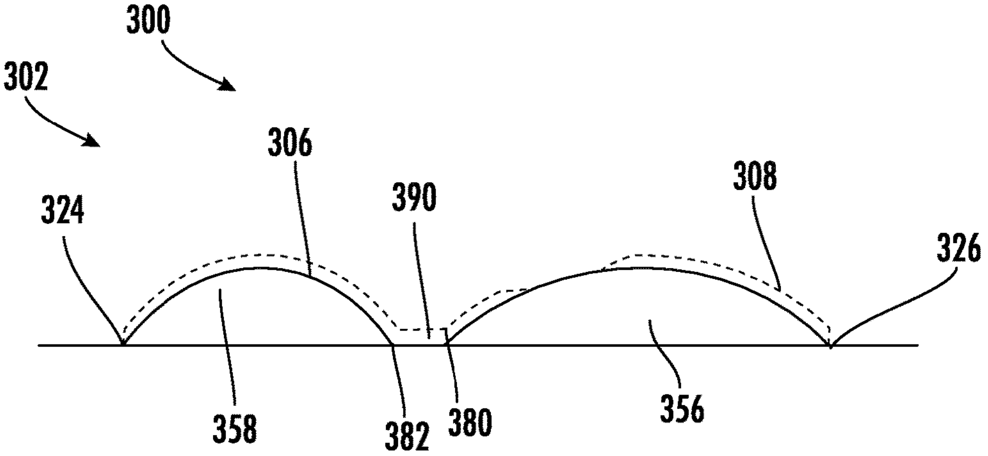
FIG. 4 is another end elevation view of the patient positioning and support system of FIG. 2, according to an exemplary embodiment.

Referring now to FIG. 4, when the bottom inflatable portion 354 is inflated, the top inflatable portion 304 is preferably deflated. As shown in FIG. 4, when the bottom inflatable portion 354 is inflated the bottom turning wedge 356 may inflate to a greater height (e.g., more volume) than the bottom support bolster 358. In this regard, the distance between the second peripheral side edge 326 and the third longitudinal attachment line 380 is greater than the distance between the first peripheral side edge 324 and the fourth longitudinal attachment line 382. In an exemplary embodiment, the distance between the second peripheral side edge 326 and the third longitudinal attachment line 380 is 16 inches, and the distance between the first peripheral side edge 324 and the fourth longitudinal attachment line 382 is 11 inches. As discussed above, other combinations and distances are contemplated herein. Further, in an exemplary embodiment, the third longitudinal attachment line 380 and the fourth longitudinal attachment line 382 may be separated by a distance (e.g., 5 inches), such that when the bottom inflatable portion 354 is inflated there is a bottom valley 390 between the bottom turning wedge 356 and the bottom support bolster 358.

As shown in FIGS. 3-4, the top turning wedge 306 and the bottom support bolster 358 are positioned on the first side of the inflatable device 302. Conversely, the top support bolster 308 and the bottom turning wedge 356 are positioned on a second side of the inflatable device 302. In this regard, the top turning wedge 306 and the bottom turning wedge 356 are positioned on opposite sides of the inflatable device, and the top support bolster 308 and the bottom support bolster 358 are positioned on opposite sides of the inflatable device 302, in order to allow for turning a patient from one side to another.

Figure 5:
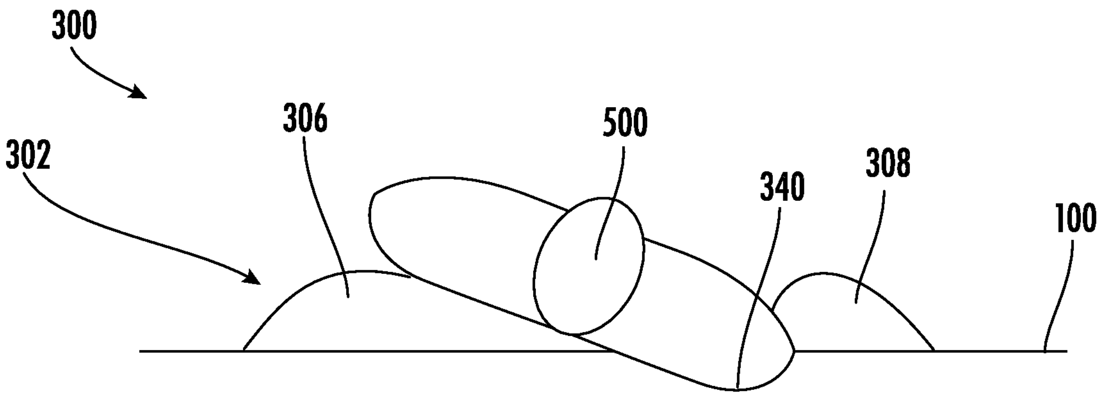
FIG. 5 is an end elevation view of a patient positioned in the patient positioning and support system of FIG. 2, according to an exemplary embodiment.
Figure 6:
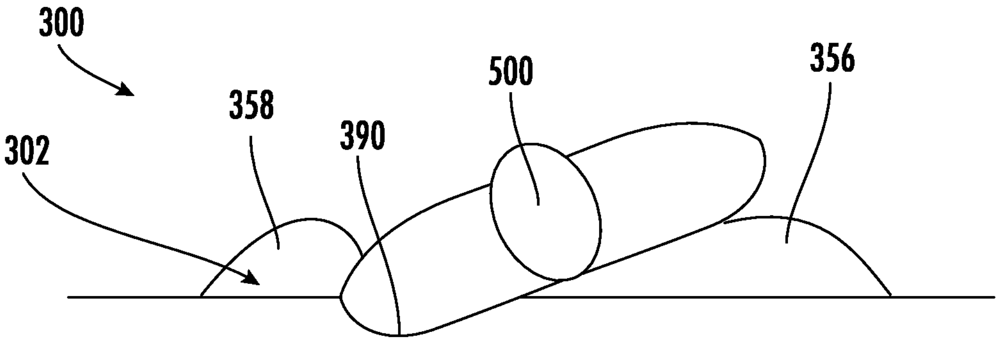
FIG. 6 is another end elevation view of a patient positioned in the patient positioning and support system of FIG. 2, according to an exemplary embodiment.

Referring now to FIGS. 5-6, a process of positioning a patient using the patient positioning and support system 300 is shown, according to an exemplary embodiment. The process discussed in FIGS. 5-6 may utilize the components of the patient positioning and support system 300 described in FIGS. 3-4.

Referring to FIG. 5, a patient positioned on the patient positioning and support system 300 is shown, according to an exemplary embodiment. As shown in FIG. 5, a patient 500 is positioned on the inflatable device 302 (on the support structure 100). In an exemplary embodiment, the patient 500 is initially positioned on the inflatable device 302 when the inflatable device 302 is deflated. Once the patient 500 is properly positioned, an inflation device (such as an air pump) may be used to inflate the inflatable device 302 (e.g., via the inflation port 110). As discussed briefly with regard to FIG. 3, as the inflatable device 302 inflates (e.g., the top inflatable portion 304), the top turning wedge 306 and/or the top support bolster 308 are inflated. In some embodiments, the top turning wedge 306 and the top support bolster 308 inflate at different times. In other embodiments, the top turning wedge 306 and the top support bolster 308 inflate at the same time. As shown in FIG. 5, when the top turning wedge 306 and the top support bolster 308 are sufficiently inflated, the patient 500 is moved into a tilted position (e.g., rolled, turned, etc.) on the inflatable device 302, such that a first side of the patient 500 may be positioned on the top turning wedge 306, while a second side of the patient 500 is supported by the top support bolster 308. In addition, a portion of the body of the patient 500 may also be positioned in the top valley 340 of the inflatable device 302 (and supported by the top support bolster 308), such that the inflatable device 302 resists against the patient 500 moving or sliding.

Referring now to FIG. 6, another view of the patient 500 positioned on the patient positioning and support system 300 is shown, according to an exemplary embodiment. As briefly discussed above, sometimes it may be desirable for a healthcare provider to reposition (e.g., roll, turn, etc.) a patient during the course of certain medical procedures and/or patient care cases. In this regard, after positioning the patient 500 as described in FIG. 5, a healthcare provider may desire to reposition (e.g., turn or roll) the patient 500 using the inflatable device 302.

As discussed above with regard to FIGS. 3-4, the inflatable device 302 may be inflated and/or deflated in various ways. For example, in one embodiment the top inflatable portion 304 (e.g., the top turning wedge 306 and/or the top support bolster 308) may be deflated (e.g., via the inflation port 110), while the bottom inflatable portion 354 (e.g., the bottom turning wedge 356 and/or the bottom support bolster 358) is inflated (e.g., via the inflation port 110). In other embodiments, the bottom inflatable portion 354 may be inflated, which may force (e.g., via pressure) the top inflatable portion 304 to deflate. In yet other embodiments, a plurality of inflation ports 110 may be used to deflate and/or inflate the top inflatable portion 304 and/or the bottom inflatable portion 354. As discussed above, any combination of inflation ports 110 and/or inflation and deflation processes are contemplated herein.

As shown in FIG. 6, when the bottom inflatable portion 354 (e.g., the bottom turning wedge 356 and the bottom support bolster 358) is sufficiently inflated, and the top inflatable portion 304 is sufficiently deflated, the patient 500 may be repositioned (e.g., rolled, turned, etc.). In this regard, the patient 500 may be "rolled" (i.e., repositioned to their other side), such that the second side of the patient 500 may be positioned on the bottom turning wedge 356, while the first side of the patient 500 is supported by the bottom support bolster 358. Similar to what was discussed with regard to FIG. 5, a portion of the body of the patient 500 may also be positioned in the bottom valley 390 (and supported by the bottom support bolster 358), such that the inflatable device 302 may resist against the patient 500 moving or sliding.

Figure 7:
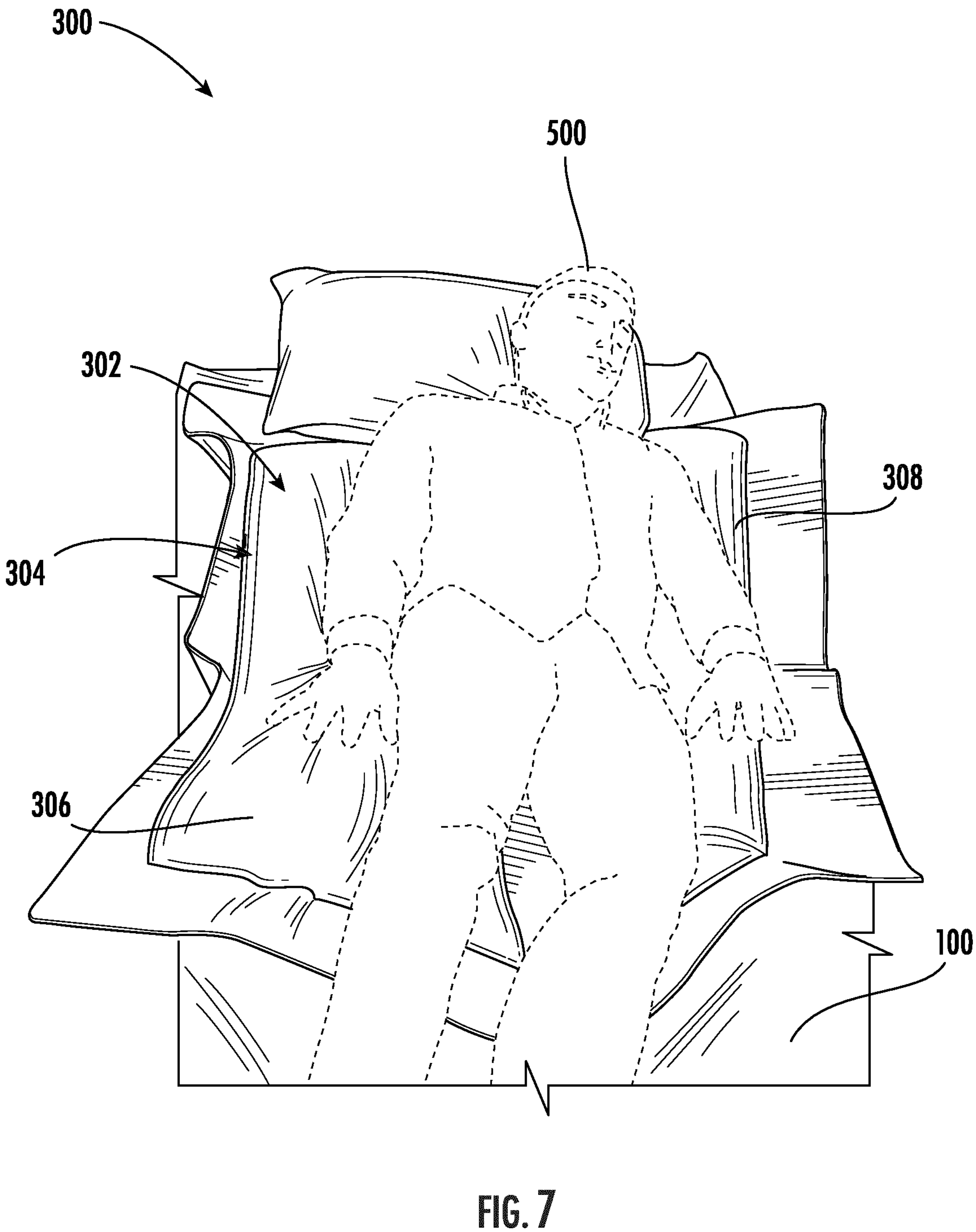
FIG. 7 is a top perspective view of a patient positioned in the patient positioning and support system of FIG. 2, according to an exemplary embodiment.

Referring to FIG. 7, another view of the patient 500 positioned on the patient positioning and support system 300 is shown, according to an exemplary embodiment. As shown in FIG. 7, the patient 500 may be positioned on the inflatable device 302, and the inflatable device 302 may conform to a variety of positions. For example, as shown in FIG. 7, the support structure 100 may be in a slightly upright position (e.g., the head of the support structure 100 may be raised thirty degrees, the feet of the support structure 100 may be raised, etc.). In addition, the patient 500 may be in a variety of positions (e.g., in a gatched position, with the knees of the patient 500 slightly elevated, etc.). The inflatable device 302 may conform to the position of the support structure 100 and/or the patient 500, such that the patient 500 may remain in a "titled" (e.g., rolled) position and supported by the inflatable device 302. As shown in FIG. 7, the inflatable device 302 conforms to the upright position of the support structure 100, and the gatched position of the patient 500, such that the patient 500 remains positioned on the top turning wedge 306 and titled slightly toward the top support bolster 308. The top support bolster 308 (and the top valley 340) may provide additional support to the patient 500, so as to resist against the patient 500 moving or sliding on the inflatable device, even in various positions of the head, legs, etc., as described above. If a healthcare provider desired to roll the patient 500, the inflatable device 302 (and components thereof) may be deflated and/or inflated to position the patient 500, as described herein.

In addition, the patient positioning and support system 50 may include an inflation device (e.g., an air pump) for providing air to inflate the inflatable device 102 or 302. As described above, the inflatable device 102 or 302 is configured to couple to at least one inflation port 110 of the inflatable device 102 or 302, or may be configured to couple to the plurality of inflation ports 110 (if provided). Furthermore, the inflation device may have features to automatically assist with turning and positioning a patient. For example, the inflation device may include a timer which causes the inflation device to inflate and/or deflate the inflatable device 102 or 302, or portions thereof, after an elapsed time. In this way, the inflatable device 102 or 302 can be used to turn the patient from side to side without any action by a caregiver. Also, the inflatable device 102 or 302, or the inflation device may include a sensor which generates a signal to cause the inflation device to inflate and/or deflate the inflatable device 102 or 302, or portions thereof, if the patient is not properly positioned or the device has become improperly deflated (i.e., an air volume within the inflatable device 102 or 302 falls below a predetermined threshold).

All or some of the components described in the patient positioning and support system 50 (and/or patient positioning and support system 300) may be provided in a kit, which may be in a pre-packaged arrangement. For example, the inflatable device 102 (deflated), or the inflatable device 302 (deflated), may be provided in a pre-folded arrangement or assembly, in approximately the same position the components would be positioned in use. In this regard, the inflatable device 102 (or inflatable device 302) may be pre-folded to form the pre-folded assembly. This pre-folded assembly can be unfolded when placed on the support structure 100 or beneath the patient 500. It should be understood that different folding patterns can be used. For example, the pre-folded inflatable device 102 (or the inflatable device 302) a may be unfolded together on the support structure 100 in order to facilitate the patient positioning system. Additionally, the inflatable device 102 (or the inflatable device 302) may be packaged by wrapping with a packaging material to form a package, and may be placed in the pre-folded assembly before packaging. Other packaging arrangements may be used in other embodiments.

Though the aforementioned patient positioning and support system 50 (and/or patient positioning and support system 300), and all the components described herein, are intended for single use and then disposal, the patient positioning and support system 50 (and/or patient positioning and support system 300), and any of the components described herein, may be refurbished for reselling and reusing. Refurbishment of the patient positioning and support system 50 (and/or its components described herein) may include steps such as inspecting the system, removing foreign particles, stains, or odors by washing one or more surfaces of the system, repairing tears or damage to the system, repairing or supplementing the stitching, such as at the seams, replacing any elements or components (e.g., the inflatable device 102, the inflatable device 302, etc.), replacing missing items from a kit, etc. Refurbishing may also include decontaminating the system and/or any of the components such as by sterilization means, such as the use of gamma radiation, electron-beam radiation, X-ray radiation, Ethylene oxide (EtO), steam, such as through the use of an autoclave, or any combination thereof. Furthermore, refurbishing and reselling may include repackaging the system and/or the components described herein.

Figure 8:
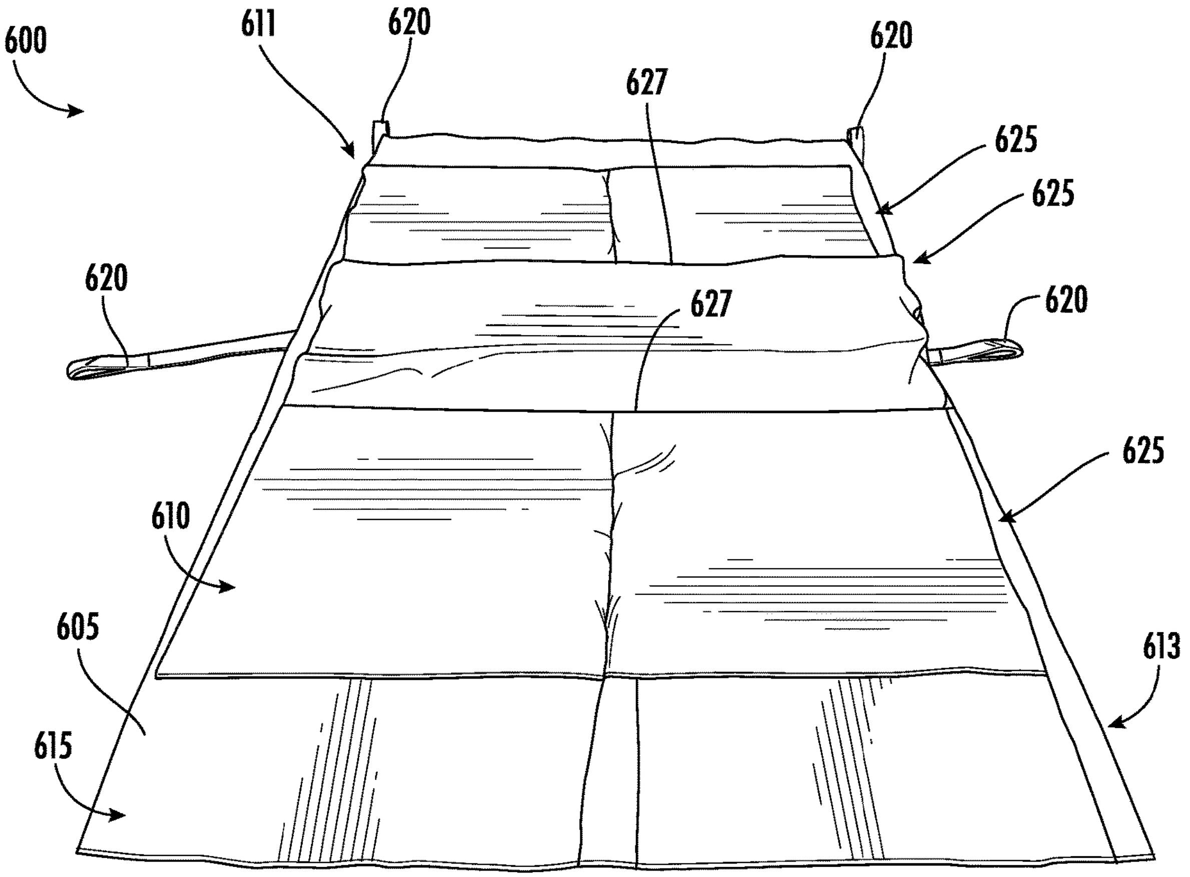
FIG. 8 is a bottom perspective view of a second embodiment of a patient positioning and support system in an unfilled configuration, according to an exemplary embodiment.

In various alternative embodiments, the patient positioning and support system includes pockets configured to be filled by support devices including, but not limited to pillows and foam supports (e.g., wedges, blocks, etc.). FIG. 8 shows a bottom perspective view of a patient positioning and support system 600, according to an exemplary embodiment. The patient positioning and support system 600 includes a top sheet 605 and a bottom sheet 610, where the top sheet 605 is configured to contact a patient positioned atop the patient positioning and support system 600 and the bottom sheet 610 is configured to contact and slide relative to a support surface upon which the patient positioning and support system 600 is placed. The patient positioning and support system 600 is configured to have a top end 611 and a bottom end 613 such that when the system 600 is in use, the top end 611 supports a head or torso of a patient and the bottom end 613 supports feet or legs of the patient. In some embodiments, the patient positioning and support system 600 may include one or more high friction regions ("retention regions") 635 disposed within or coupled to the top sheet 605, which may be configured to prevent a patient from sliding relative to the top sheet 605. The high friction regions 635 may include one or more dense fiber fabrics, woven materials, and/or non-slip polymer sections coupled to or integrally formed within the top sheet 605. In various embodiments, the bottom sheet 610 may be made of or include a slippery or low-friction material configured to slide relative to itself and/or adjacent surfaces (e.g., a support surface upon which the patient positioning and support system 600 is placed). FIG. 8 shows a bottom view of the patient positioning and support system 600 in which a bottom side 615 is facing upwards. In various embodiments, when the patient positioning and support system 600 is in use, the bottom side 615 is configured to directly contact a support surface upon which the system 600 may be placed. As shown, the patient positioning and support system 600 may include one or more handles or straps 620, which may be coupled to the top sheet 605 at one or both of the top and bottom ends 611, 613 and/or along the sides of the system 600 (i.e., side perpendicular to the top and bottom ends 611, 613). In various embodiments, the one or more straps 620 may include or be made of woven or non-woven material and may include one or more loops to facilitate ease of grasping. As shown, the bottom sheet 610 may be configured to include one or more pockets 625, which are formed between stitched regions 627, where each of the stitched regions 627 couples the bottom sheet 610 to the top sheet 605. Each of the pockets 625 may be configured to be somewhat tubular in nature such that each of the pockets 625 includes at least two opposing ends, where each pocket 625 is oriented substantially parallel with the top and bottom ends 611, 613 of the patient repositioning and support device 600.

Figure 9:
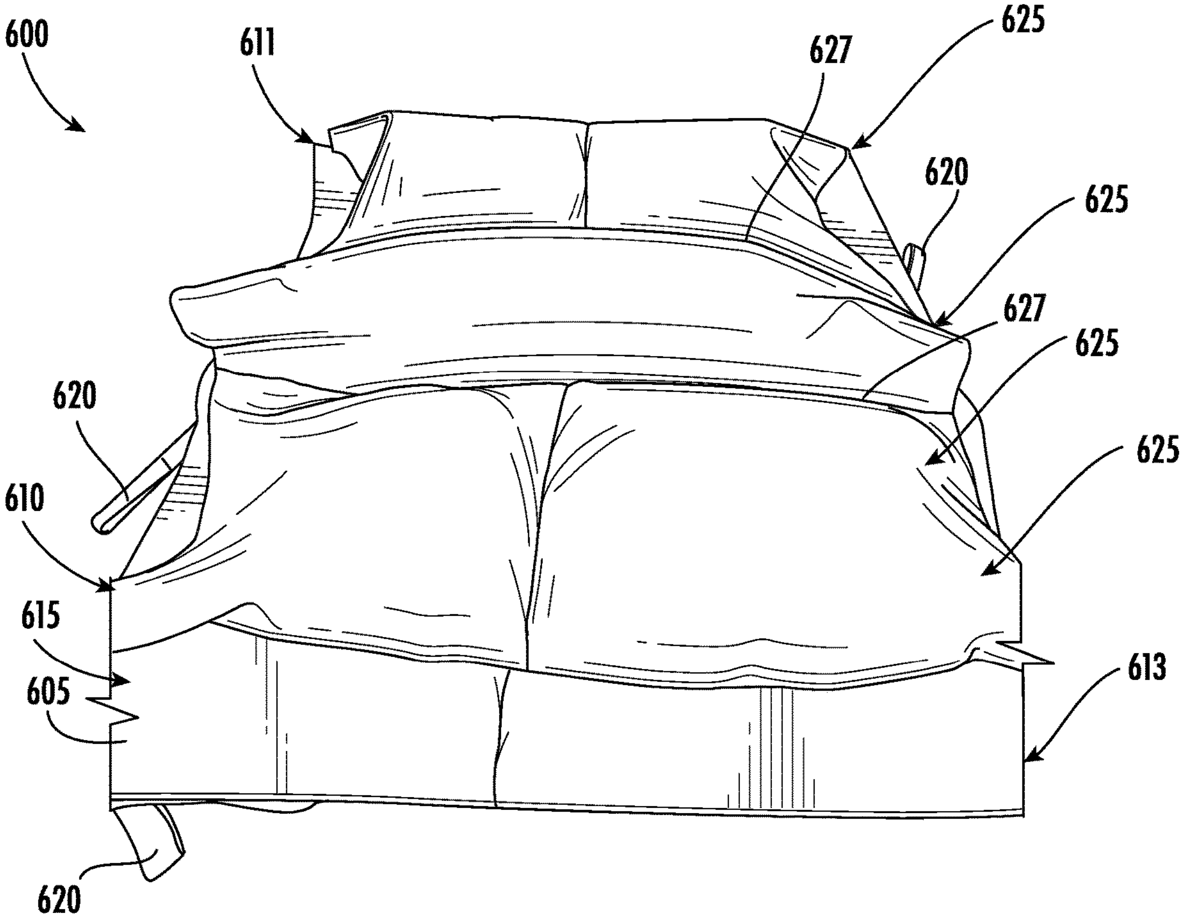
FIG. 9 is a bottom perspective view of the patient positioning and support system of FIG. 8 in a filled configuration, according to an exemplary embodiment.

As shown in FIG. 9, each of the pockets 625 may be configured to be filled with one or more support devices such as pillows, wedges, foam blocks, etc. Accordingly, when each of the pockets 625 are respectively filled with a support device, the patient positioning and support system 600 may elevate a patient or a portion of the patient's body disposed on the system 600 from the support surface upon which the system 600 is placed. Although FIGS. 8 and 9 show the patient positioning and support system 600 including three pockets 625, the system 600 may include any number of pockets 625. Furthermore, although FIGS. 8 and 9 show the patient positioning and support system 600 having the pockets 625 aligned in a configuration substantially parallel with each of the top and bottom ends 611, 613, various embodiments may include pockets 625 aligned in any configuration suitable for elevating or turning a patient positioned on the patient positioning and support system 600.

Figure 11:
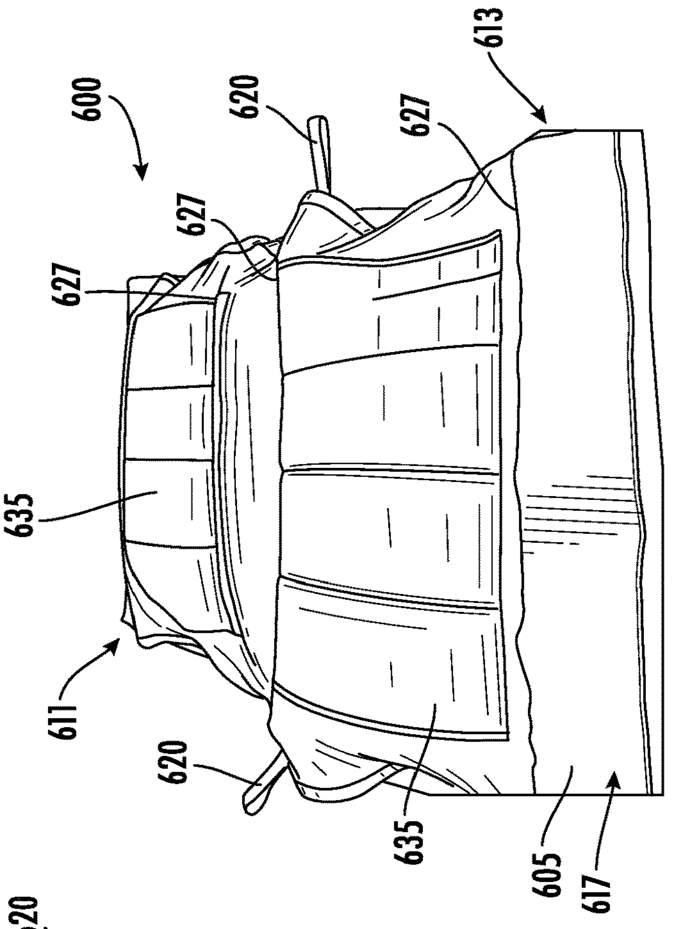
FIG. 11 is a top perspective view of the patient positioning and support system of FIG. 8 in a filled configuration, according to an exemplary embodiment.
Figure 10:
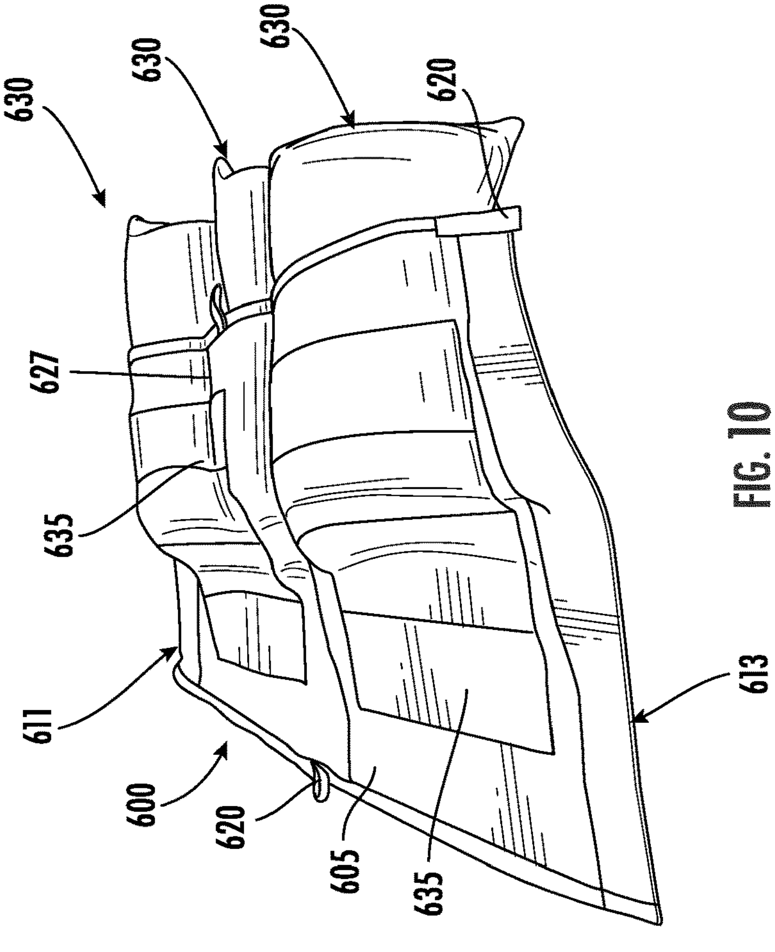
FIG. 10 is a top perspective view of the patient positioning and support system of FIG. 8 in a partially filled configuration, according to an exemplary embodiment.

In various embodiments, the pockets 625 may be configured to be filled with one or more pillows 630, as shown in FIGS. 10 and 11. An amount of filling of the pockets 625 may be based on the desired final position of the patient disposed upon the patient positioning and support system 600. For example, if the patient is to be turned or rotated, pillow(s) 630 may be inserted a portion of the way into the pockets 625, as shown in FIG. 10. In embodiments where the patient is to be fully elevated from a support surface and repositioned or transported, the pillows 630 may be inserted fully into the pockets 625, as shown in FIG. 11. In some embodiments, a single pocket 625 may be filled with multiple pillows 630. During use, when the pillow(s) 630 are inserted at least partially into the pockets 625, a patient disposed atop the patient positioning and support system 600 may be elevated from a support surface (e.g., hospital bed), which enables the patient to be rotated, turned, repositioned, or transported from one surface to another as facilitated by the bottom sheet 610 sliding relative to the support surface and/or as pulled or guided by one or more medical personnel pulling on the straps 620. In various embodiments, the pillows 630 may be filled with at least one of air or stuffing (e.g., loose fiber, polyester, down, etc.).

Figure 12:
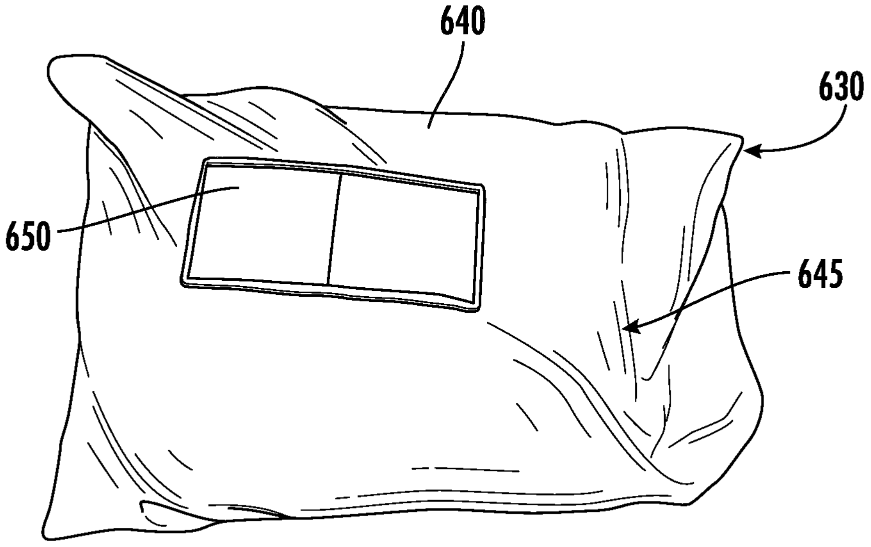
FIG. 12 is a top perspective view of a pillow case configured to be positioned within the patient positioning and support system of FIG. 8, according to an exemplary embodiment.
Figure 13:
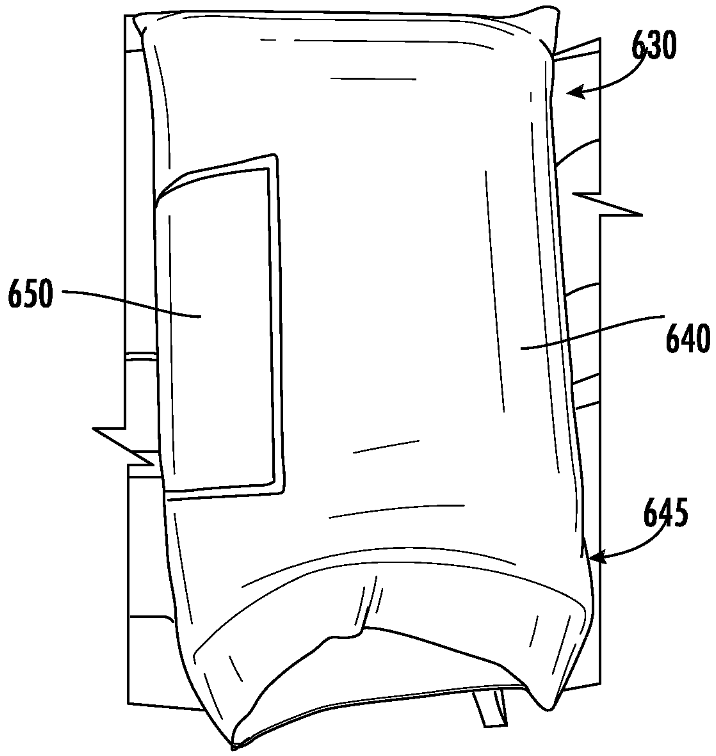
FIG. 13 is a top perspective view of another pillow case configured to be secured within the patient positioning and support system of FIG. 8, according to an exemplary embodiment.

FIGS. 12 and 13 show top perspective views of the pillow 630, which is configured to be inserted within the pockets 625, according to various exemplary embodiments. As shown, the pillow 630 may include a pillowcase 640, which is configured to prevent soiling of the pillow 630 and/or insulate an inner compartment or receptacle 645 (i.e., containing the air and/or stuffing) from contamination from bacterial, fungal, and/or microbial contaminants. As shown in FIG. 12, the pillowcase 640 may include at least one region 650 configured to engage with an inner surface of the pockets 625 to secure the pillow 630 therein. In various embodiments, the at least one region 650 may include or be made of lint brush fabric, as shown in FIG. 12. In various embodiments, the at least one region 650 may include or be made of lint brush and loop fabric, as shown in FIG. 13, to secure the pillow 630 within at least one of the pockets 625. In various embodiments, the pockets 625 may include at least one engagement region disposed along an inner surface of the pockets 625, which may be configured to engage with the at least one regions 650 of the pillows 630 to secure the pillows 630 within the pockets 625. Although FIGS. 12 and 13 show the at least one region 650 configured as a singular rectangular region disposed on a side of the pillowcase 640, in various embodiments, the pillowcase 640 may include any number of regions 650, which may be configured to have any suitable shape for engaging with an inner surface of the pockets 625.

Figure 15:
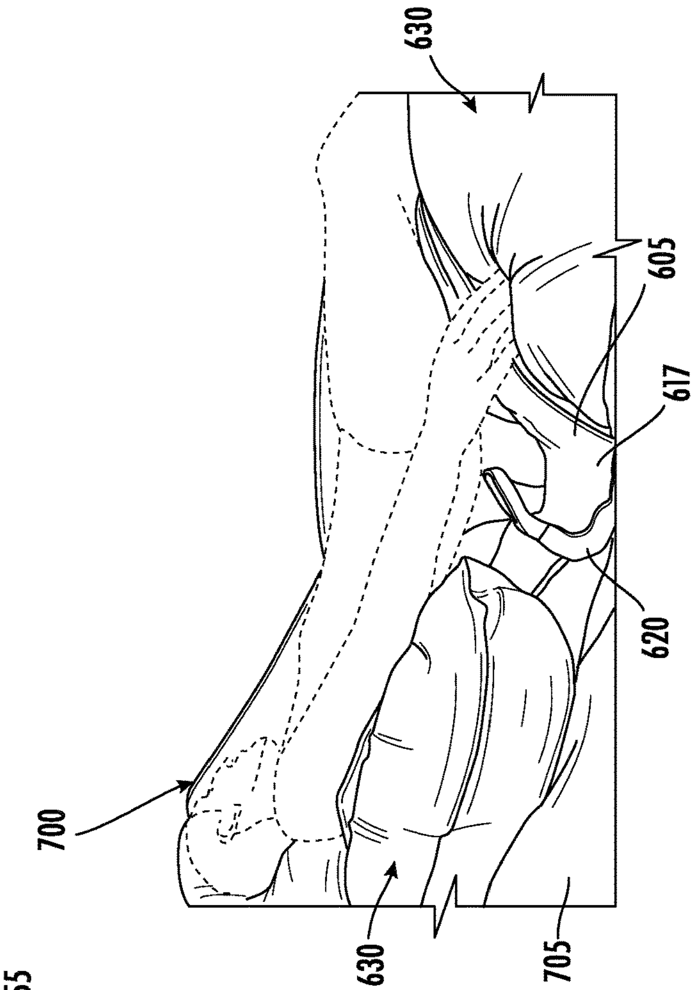
FIG. 15 is a side view of the patient positioning and support system of FIG. 8 supporting a patient during repositioning, according to an exemplary embodiment.
Figure 14:
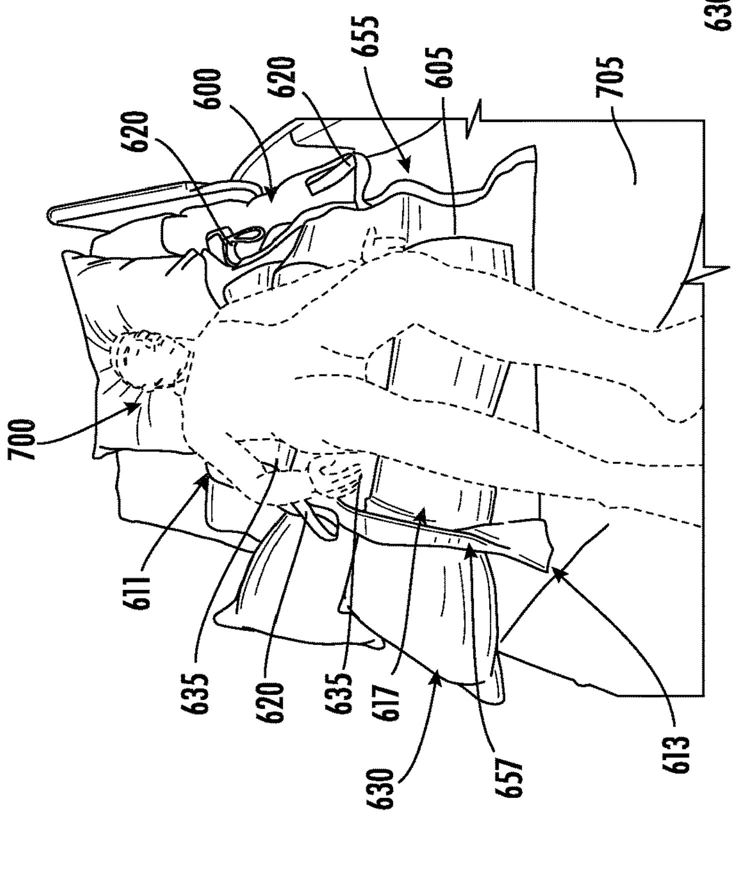
FIG. 14 is a top perspective view of the patient positioning and support system of FIG. 8 supporting a patient during repositioning, according to an exemplary embodiment.
Figure 16:
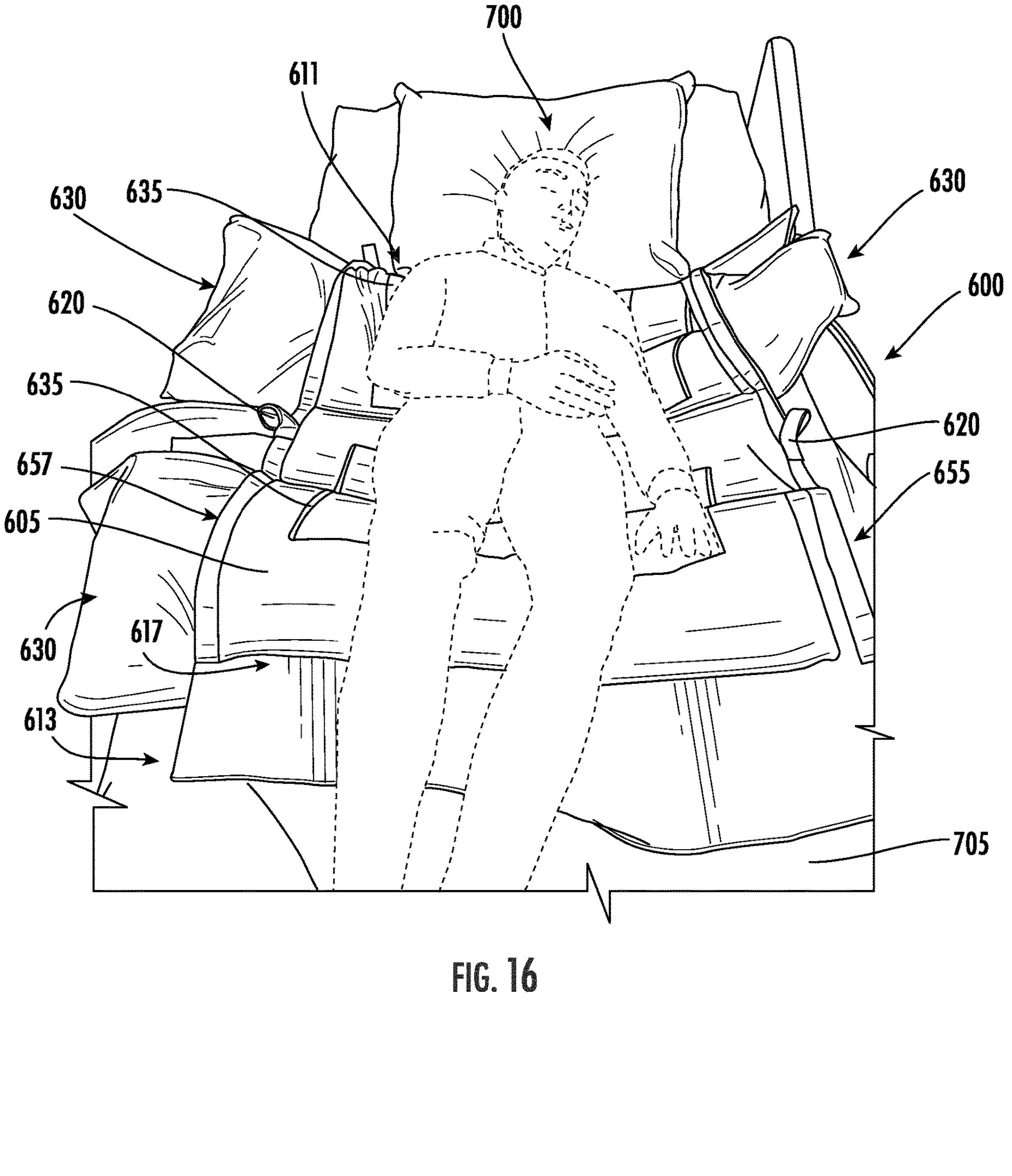
FIG. 16 is a top perspective view of the patient positioning and support system of FIG. 8 supporting a patient, according to an exemplary embodiment.

FIGS. 14-16 show the patient positioning and support system 600 being used to reposition a patient 700, where the patient 700 is disposed in a supine position. As shown in FIG. 14, the patient 700 may be disposed on a top side 617 of the patient positioning and support system 600 such that the patient 700 is disposed to contact the top sheet 605. As shown, the patient positioning and support device 600 is oriented such that the top end 611 is disposed near the head of the patient 700 and the bottom end 613 is disposed near the legs and/or feet of the patient 700. The pockets 625 within the bottom sheet 610 are positioned so as to contact a support surface 705 upon which the patient 700 and the patient positioning and support system 600 are disposed. To reposition the patient 700, such as to rotate the patient from the supine position to an inclined or prone position, one or more pillows 630 may be inserted into the pockets 625. As shown, the pillows 630 may be inserted into the pockets 625 from a first side 657, which is disposed an opposing second side 655, where both the sides 655, 657 are oriented substantially perpendicular to the top and bottom ends 611, 613. Accordingly, when the pillows 630 are inserted along the first side 657, the first side 657 becomes elevated relative to the second side 655, which results in a rotation of the patient 700.

In various embodiments, a spacing of the stitched regions 627 and/or a width of the pockets 625 may be configured such that various parts of the patient 700 (i.e., parts of the patient's body) do not contact the top side 617. For example, as shown in FIG. 15, a width of the pockets 625 may be configured such that when the pillows 630 are inserted within the pockets 625, the sacrum of the patient 700 is elevated and not load bearing. Accordingly, when in use, the patient positioning and support system 600 may relieve pressure points and prevent stress on areas of potentially high load throughout the body of the patient 700 during repositioning. As shown in FIG. 16, the pillows 630 may be fully inserted within the pockets 625 to elevate the patient 700 from the support surface 705. When the pillows 630 are fully inserted, the body of the patient 700 may be supported by the patient repositioning and support surface 600 such that points of high pressure (e.g., sacrum, should blades, etc.) are elevated and cushioned by the pillows 630. Thus, to reposition, support, and/or transfer the patient 700, the patient repositioning and support system 600 may be inserted beneath the patient 700. One or more pillows 630 may then be inserted, partially or fully, within the pockets 625 to elevate the patient from the support surface 705. One or more medical personnel may then use the one or more handles or straps 620 to manipulate the patient repositioning and support system 600 to reposition, transfer, and/or otherwise support the patient 700.

Figure 18:
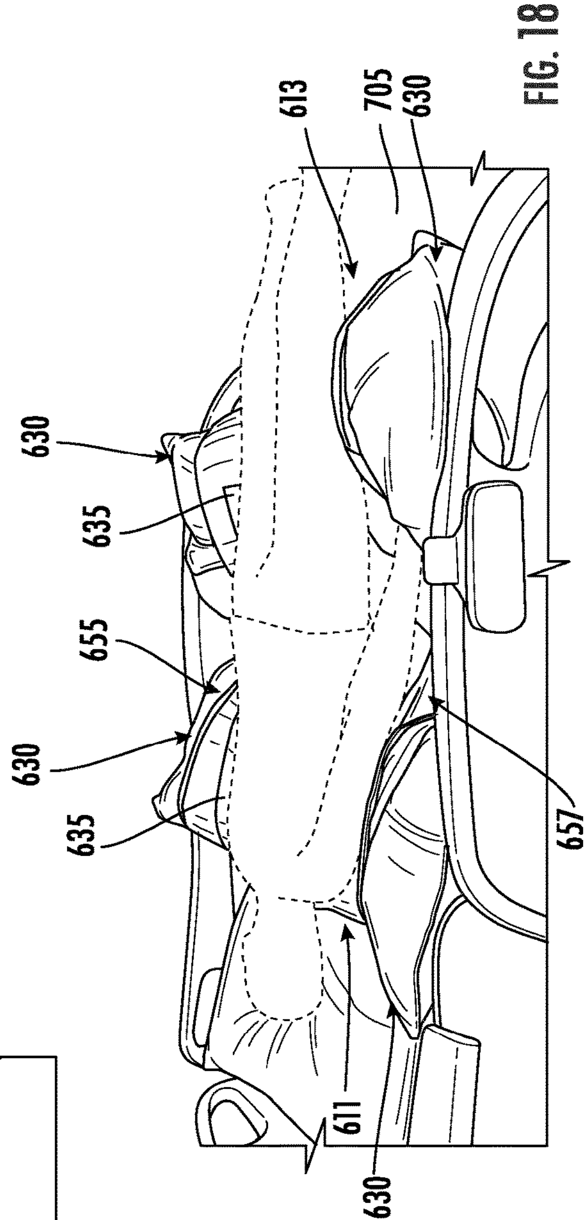
FIG. 18 is a side view of the patient positioning and support system of FIG. 8 supporting a patient in a prone position, according to an exemplary embodiment.
Figure 17:
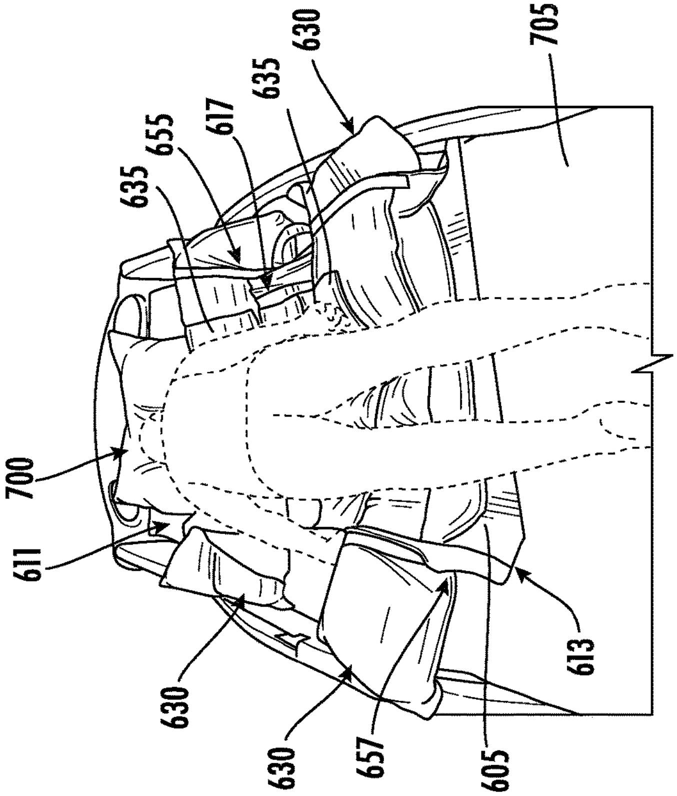
FIG. 17 is a top perspective view of the patient positioning and support system of FIG. 8 supporting a patient in a prone position, according to an exemplary embodiment.

FIGS. 17 and 18 show the patient repositioning and support system 600 used to provide support to the patient 700 when the patient 700 is in a prone position. As shown, the patient repositioning and support system 600 may be configured such that when the pockets 625 are filled with the pillows 630, various parts of the patient 700 body are offloaded (i.e., not bearing load or in contact with a surface of the system 600). For example, s shown in FIG. 18, the patient 700 stomach is elevated and not in contact with the top side 617 of the patient repositioning and support device such that the stomach is not load bearing or not subject to excessive pressure during repositioning of the patient 700. In various embodiments, a width of the pockets 625 (i.e., a distance between the stitched regions 627) may be configured to facilitate offloading of various other regions of the patient 700 body including, but not limited to, a chest (e.g., mammary glands), knees, or head.

Figure 19:
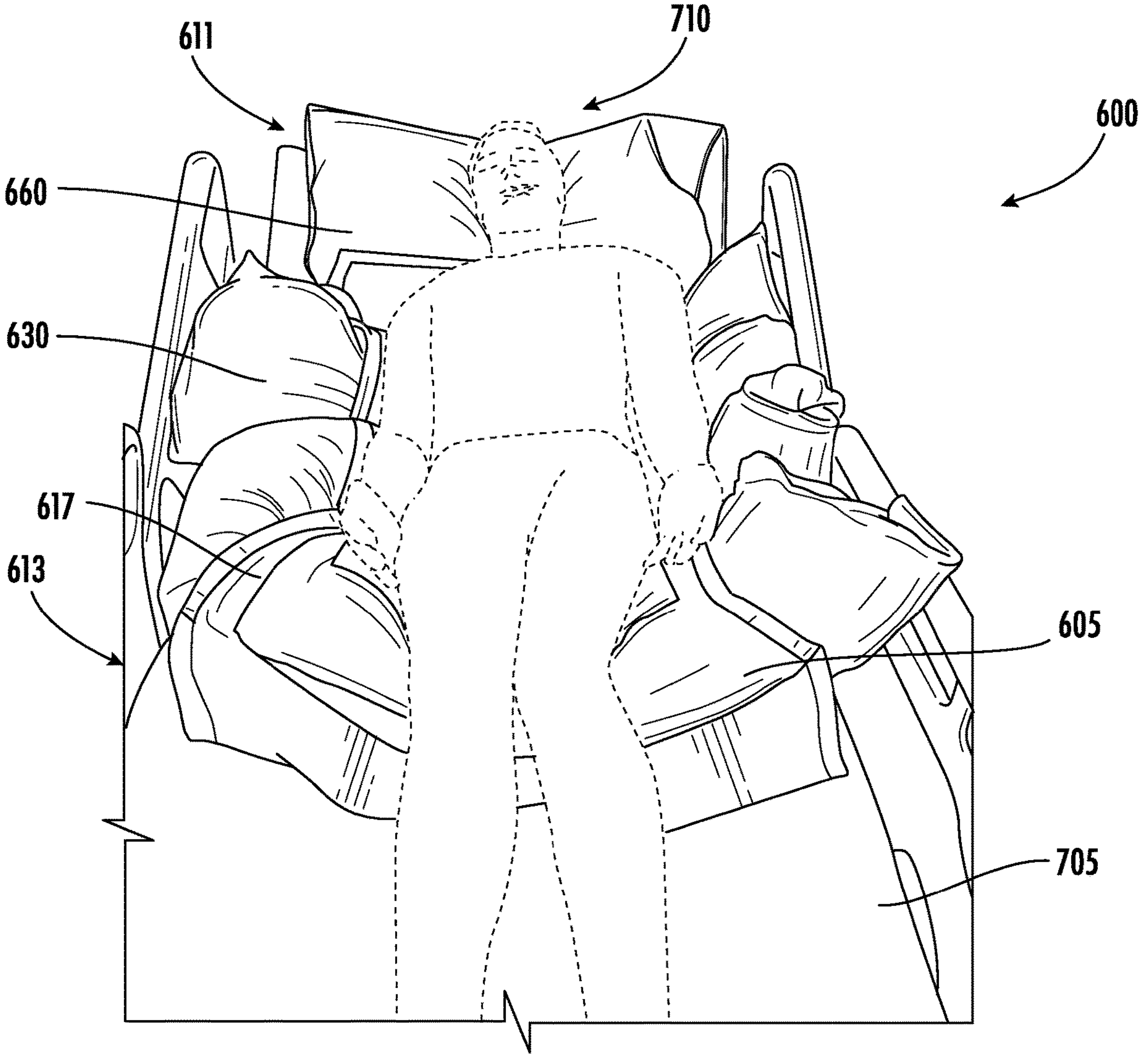
FIG. 19 is a top perspective view of a patient positioning and support system including a cushion for supporting a patient's head, according to an exemplary embodiment.

In yet other embodiments, the patient repositioning and support system 600 may be configured to directly provide support to the head of the patient 700, as shown in FIG. 19. As shown, the patient repositioning and support system 600 may include a fourth pocket 625, which is configured to define a support region or cushion 660 for supporting the head 710 of the patient 700. In various embodiments, the cushion 660 may be configured to have the same or different dimensions (e.g., width of the respective pocket 625) relative to the other pockets 625. In various embodiments, a stiffness, thickness, or constituency (e.g., an amount of air, a stuffing type or amount, etc.) may be based on a desired level of elevation, a degree or amount of repositioning, and/or a desired amount of cushion to be provided for the patient 700.

Notwithstanding the embodiments described above in reference to FIGS. 1-19, various modifications and inclusions to those embodiments are contemplated and considered within the scope of the present disclosure.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. An inflatable device, comprising:

a first layer of material and a second layer of material coupled together around at least a peripheral edge, and wherein at least one cavity is formed between the first layer and the second layer; and at least one input port for receiving air to inflate the at least one cavity;

wherein the inflatable device is configured such that when the at least one cavity is inflated, a turning wedge and a support bolster are formed; and a third layer of material coupled to the first layer of material and the second layer of material around at least the peripheral edge, and wherein at least one lower cavity is formed between the second layer and the third layer, wherein the inflatable device is further configured such that when the at least one lower cavity is inflated, a second turning wedge and a second support bolster are formed.

2. The device of claim 1, wherein the first layer is further attached to the second layer along a first longitudinal attachment line and along a second longitudinal attachment line, spaced apart from the first longitudinal attachment line such that the turning wedge is formed between a first peripheral side edge and the first longitudinal attachment line and the support bolster is formed between a second peripheral side edge and the second longitudinal attachment line.

3. The device of claim 2, wherein a distance between the first peripheral side edge and the first longitudinal attachment line is greater than a distance between the second peripheral side edge and the second longitudinal attachment line such that the turning wedge inflates to a greater height than the support bolster.

4. The device of claim 3, wherein the distance between the first peripheral side edge and the first longitudinal attachment line is 16 inches and the distance between the second peripheral side edge and the second longitudinal attachment line is 11 inches.

5. The device of claim 2, wherein a distance between the first longitudinal attachment line and the second longitudinal attachment line forms a valley between the turning wedge and the support bolster.

6. The inflatable device of claim 1, wherein the at least one cavity comprises a first cavity forming the turning wedge and a second cavity forming the support bolster.

7. The inflatable device of claim 1, wherein the inflatable device is configured such that when the at least one cavity is inflated, a patient laying on the inflatable device is turned towards a first lateral side and when the at least one lower cavity is inflated, the patient is turned towards a second lateral side without adding or removing any structures under the patient.

8. The inflatable device of claim 1, further comprising a first input port for inflating the at least one cavity and a second input port for inflating the at least one lower cavity.

9. The device of claim 1, wherein the third layer is further attached to the second layer along a third longitudinal attachment line and along a fourth longitudinal attachment line, spaced apart from the third longitudinal attachment line such that the second turning wedge is formed between a first peripheral side edge and the third longitudinal attachment line and the second support bolster is formed between a second peripheral side edge and the fourth longitudinal attachment line.

10. The device of claim 9, wherein a distance between the first peripheral side edge and the third longitudinal attachment line is greater than a distance between the second peripheral side edge and the fourth longitudinal attachment line such that the second turning wedge inflates to a greater height than the second support bolster.

11. The device of claim 10, wherein a distance between the first peripheral side edge and the third longitudinal attachment line is 16 inches and a distance between the second peripheral side edge and the fourth longitudinal attachment line is 11 inches.

12. The device of claim 9, wherein a distance between the third longitudinal attachment line and the fourth longitudinal attachment line forms a valley between the second turning wedge and the second support bolster.

13. The inflatable device of claim 1, wherein the at least one lower cavity comprises a first lower cavity forming the second turning wedge and a second lower cavity forming the second support bolster.

14. The device of claim 1, wherein the first turning wedge is on a first side of the inflatable body, the first support bolster is on a second side of the inflatable device, the second support bolster is on the first side of the inflatable body, and the second turning wedge is on the second side of the inflatable body, such that the first and second turning wedges are offset and the first and second support bolsters are offset.

* * * * *